United States Patent
Venable et al.

(10) Patent No.: US 6,281,802 B1
(45) Date of Patent: Aug. 28, 2001

(54) AUTOMATIC CHLORINATOR ALARM SYSTEM

(75) Inventors: Robert T. Venable, Georgetown; John D. Lawson, Round Rock, both of TX (US)

(73) Assignee: Aerobic & Pump Controls, Inc., Georgetown, TX (US)

( * ) Notice: Subject to any disclaimer, the term of this patent is extended or adjusted under 35 U.S.C. 154(b) by 0 days.

(21) Appl. No.: 09/452,065

(22) Filed: Nov. 30, 1999

Related U.S. Application Data

(60) Provisional application No. 60/110,448, filed on Dec. 1, 1998.

(51) Int. Cl.$^7$ ............................................. G08B 21/00
(52) U.S. Cl. ..................... 340/612; 340/613; 340/615; 210/85; 210/86; 422/119
(58) Field of Search ....................... 340/540, 618, 340/619, 620, 621, 623, 624, 612, 613, 617, 615; 210/85, 86, 87, 89, 91; 422/119, 264, 266, 267

(56) References Cited

U.S. PATENT DOCUMENTS

| | | |
|---|---|---|
| 4,021,883 | 5/1977 | Harkin . |
| 4,584,106 * | 4/1986 | Held ..................................... 210/754 |
| 4,599,179 | 7/1986 | Pincon . |
| 4,797,208 | 1/1989 | Miller et al. . |
| 4,812,237 | 3/1989 | Cawley et al. . |
| 4,865,069 | 9/1989 | Lacey . |
| 4,882,046 | 11/1989 | Waite . |
| 4,911,832 | 3/1990 | Miller et al. . |
| 5,074,053 * | 12/1991 | West ......................................... 33/708 |
| 5,350,512 * | 9/1994 | Tang ....................................... 210/199 |
| 5,441,632 | 8/1995 | Charon . |
| 5,481,911 * | 1/1996 | Liang ....................................... 73/313 |
| 5,498,330 | 3/1996 | Delle Cave . |
| 5,885,446 * | 3/1999 | McGrew, Jr. ............................ 210/91 |
| 5,932,093 * | 8/1999 | Chulick ................................... 210/169 |
| 6,066,252 * | 5/2000 | Reeves .................................... 210/86 |

* cited by examiner

*Primary Examiner*—Daniel J. Wu
*Assistant Examiner*—Toan Pham
(74) *Attorney, Agent, or Firm*—Strasburger & Price L.L.P.; Paul W. Fulbright

(57) ABSTRACT

An alarm and pump control system for automatic chlorinators of the type used with septic treatment systems is disclosed. The present invention includes a switch module that couples alongside an automatic chlorinator that uses dissolvable standard size chlorine tablets in a stack and an activator module that sits on top of the stack of chlorine tablets and descends as the chlorine tablets dissolve. The switch module includes proximity switches that can be coupled to one or more alarms. The activator module includes one or more magnets that interact with the proximity switches to signal the owner that the chlorinator requires refilling or to cut off the pump power.

20 Claims, 4 Drawing Sheets

AUTOMATIC CHLORINATOR ALARM SYSTEM

This application claims the benefits of the earlier filed U.S. Provisional App. Ser. No. 60/110,448, filed Dec. 1, 1998 (1.12.1998), which is incorporated by reference for all purposes into this specification.

BACKGROUND OF THE INVENTION

1. Field of the Invention

The present invention relates to the field of wastewater treatment in septic and other wastewater systems. More particularly, the present invention relates to an alarm device within an automatic chlorinator type wastewater treatment system that provides an alarm when the chlorine level requires replenishment.

2. Description of the Related Art

Septic systems, particularly domestic septic systems used in single and multiple family dwellings, motels, restaurants, campsites, ski resorts, and other establishments that are remote from central municipal sewerage systems require safe and effective methods to treat wastewater and effluents before they are reused or discharged into the environment. Historically, these types of septic systems have discharged septic effluent into a soil absorption/purification seepage bed. In a properly functioning septic seepage bed, the soil pores filter out residual suspended solids, bacteria, and other contaminants, while microorganisms in the soil decompose dissolved organic compounds. Chemical compounds such as phosphates are absorbed, and nitrogenous compounds are oxidized to nitrates, which may then partially decompose to elemental nitrogen. With the exception of nitrates, a properly functioning absorption field almost completely purifies the septic tank effluent before the water reaches the underground water table or aquifer.

However, some soils are unsuitable for the above described soil disposal methodology. Moreover, even in well designed systems, failures can and do occur. Finally, particularly in remote locations where water is scarce or where it must be treated onsite before use, using water that has been purified to drinking water standards only once for washing clothes, personal hygiene, flushing toilets, and irrigation is expensive and wasteful. Consequently, various water reclamation systems have been developed to address the above water supply and effluent treatment issues.

One solution has been to filter and treat some portion of a household's wastewater to render it reusable for non-drinking water uses, such as irrigation, washing clothes, or flushing toilets. For example, U.S. Pat. No. 4,812,237 to Cawley, et al., discloses a closed water purification and recycle system that processes domestic wastewater to produce both potable water for cooking, drinking, and dishwashing, and non-potable water for other general household uses. Similarly, U.S. Pat. No. 5,498,330 to Cave discloses a gray water reclamation system that processes gray water from at least one household source for delivery to an outside irrigation system, inside toilets, and other appliances that do not require potable water. Cawley's system includes a disinfection unit that is described as using either ultraviolet or chlorine disinfection to kill pathogenic organisms in the water. Cave's system does not include a disinfection unit, but rather, relies upon filtering and aeration to clean the wastewater. However, Cave recognizes that the potential presence of airborne viruses in non-disinfected reclaimed water generally renders such reclaimed water unacceptable for above-ground sprinkling.

The present invention is an automatic chlorination alarm system suitable for use with automatic tablet chlorinators commonly used for treating septic effluent for irrigation or other uses where potable water is not required. The present invention could be used with the disinfection unit within the recycling system disclosed by Cawley. The present invention includes a device that senses the level of chlorine tablets in a chlorinator tube, and activates an alarm when the chlorine tablets in the tube are not timely replenished or when the unit is tampered with. Finally, the present invention is also capable of disabling irrigation or other system pumps when the chlorine level falls, to prevent the inadvertent reuse of untreated effluent.

SUMMARY

The present invention comprises a method and apparatus that provides an audible and/or visible alarm and pump control system for automatic chlorinators that are used with septic treatment systems. The present invention comprises a switch module that couples alongside an automatic chlorinator that uses dissolvable standard size chlorine tablets in a stack. The switch module includes a plurality of proximity switches in the reload zone that are coupled to one or more alarms located in a control panel or installed elsewhere in the system.

The present invention also includes an activator module that sits on top of the stack of chlorine tablets inside the chlorinator, and descends as the chlorine tablets dissolve. The activator module includes one or more magnets whose magnetic fields interact with the proximity switches in the switch module to prevent the alarm from activating. When the activator descends below the last switch in the reload zone such that the internal magnet(s) no longer interact with the last switch, the alarm circuit completes to activate an alarm, signaling the owner that the chlorinator requires refilling.

The present invention may also include a pump shut-off proximity switch inside the switch module that is capable of being coupled to the system pump. When the activator descends to the proximity of the pump shut-off switch, power to the pump can be interrupted, either for as long as the activator module is in proximity with the pump shut-off switch, or until the system is manually reset. Finally, the present invention may include a reload delay circuit that prevents the alarm from activating when the activator module is removed from the chlorinator for a short period of time, as, for example, during refilling.

BRIEF DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

The present invention comprises a method and apparatus that provides an audible and/or visible alarm and pump control system for automatic chlorinators that are used with septic treatment systems. The present invention comprises a switch module that couples alongside an automatic chlorinator that uses dissolvable standard size chlorine tablets in a stack. The switch module includes a plurality of proximity switches in the reload zone that are coupled to one or more alarms located in a control panel or elsewhere in the system.

The present invention also includes an activator module that sits on top of the stack of chlorine tablets inside the chlorinator, and descends as the chlorine tablets dissolve. The activator module includes one or more magnets that interact with the proximity switches in the switch module to prevent the alarm from activating. When the activator descends below the last switch in the reload zone such that the internal magnet(s) no longer interact with the last switch, the alarm circuit completes to activate an alarm, signaling the owner that the chlorinator requires refilling.

The present invention may also include a pump shut-off proximity switch inside the switch module that is capable of being coupled to the system pump. When the activator descends to the proximity of the pump shut-off switch, power to the pump can be interrupted, either for as long as the activator module is in proximity with the pump shut-off switch, or until the system is manually reset. Finally, the present invention may include a reload delay circuit that prevents the alarm from activating when the activator module is removed from the chlorinator for a short period of time, as, for example, during refilling. This disclosure describes numerous specific details that include specific structures, circuits, and applications in order to provide a thorough understanding of the present invention. One skilled in the art will appreciate that one may practice the present invention without these specific details.

Figure 1:
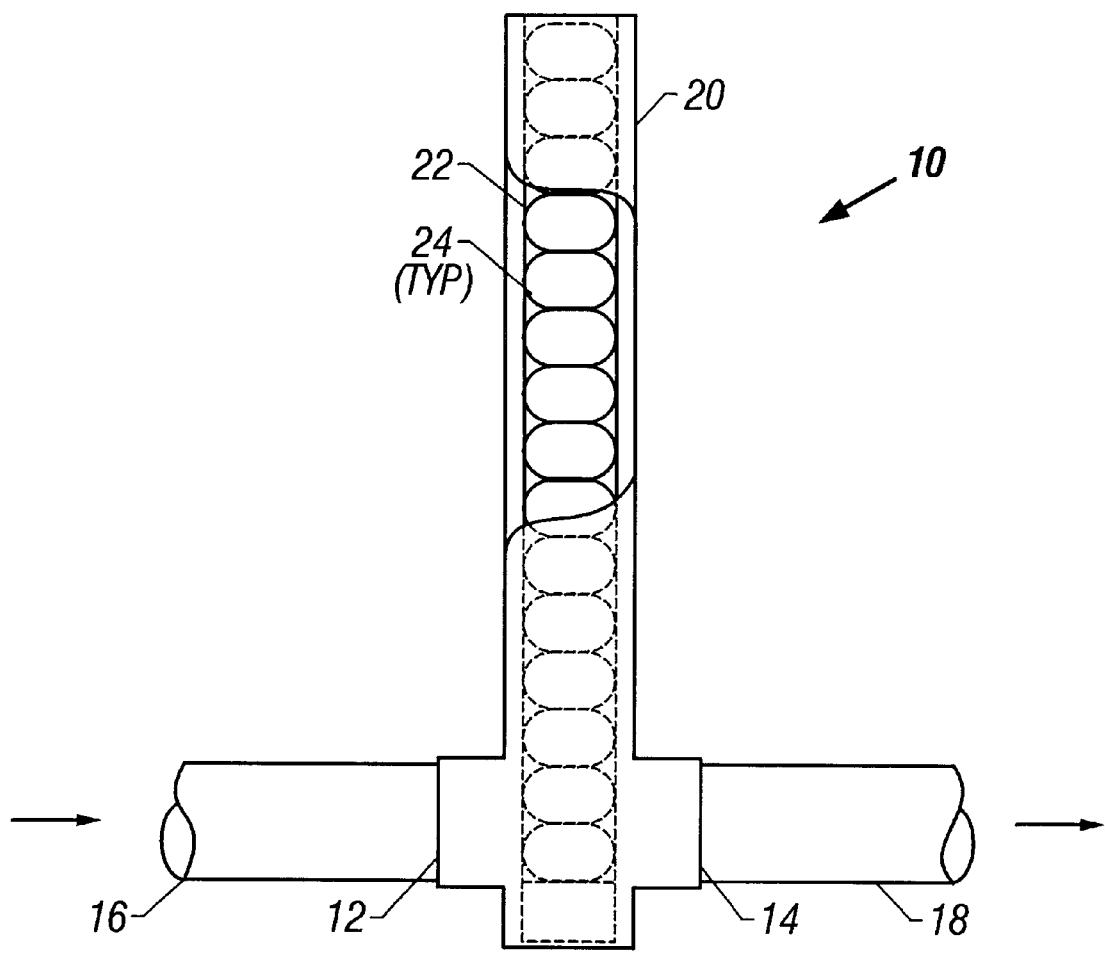
FIG. 1 shows a typical automatic chlorinator used in septic treatment and recycling systems.

FIG. 1 shows a typical automatic chlorinator 10 used in septic treatment, reclamation, and recycling systems. Automatic chlorinator 10 includes an intake 12 coupled into the system at intake pipe 16, and an outlet 14 coupled to discharge pipe 18. The arrows show the direction that effluent flows through the chlorinator 10.

Chlorinator 10 also includes a housing 20, which may or may not include an inner sleeve 22. As shown in FIG. 1, chlorinator 10 is typically sized to accept standard three-inch chlorine tablets 24, which form a stack inside the chlorinator housing 20 or inner sleeve 22. When effluent flows through the chlorinator 10 through intake 12 and outlet 14, the chlorine tablets 24 at the bottom of the stack dissolve, and the weight of the chlorine tablets 24 in the stack keeps the chlorine tablets at the bottom of the stack in contact with the flowing effluent. The user refills the chlorinator 10 by adding tablets 24 at the top of the chlorinator 10. Those skilled in the art will understand that while the typical automatic chlorinator 10 shown in FIG. 1 is designed to use standard three-inch chlorine tablets, other forms of timed release chlorine in other form factors can be used, which may or may not affect the efficiency of the system.

Figure 2:
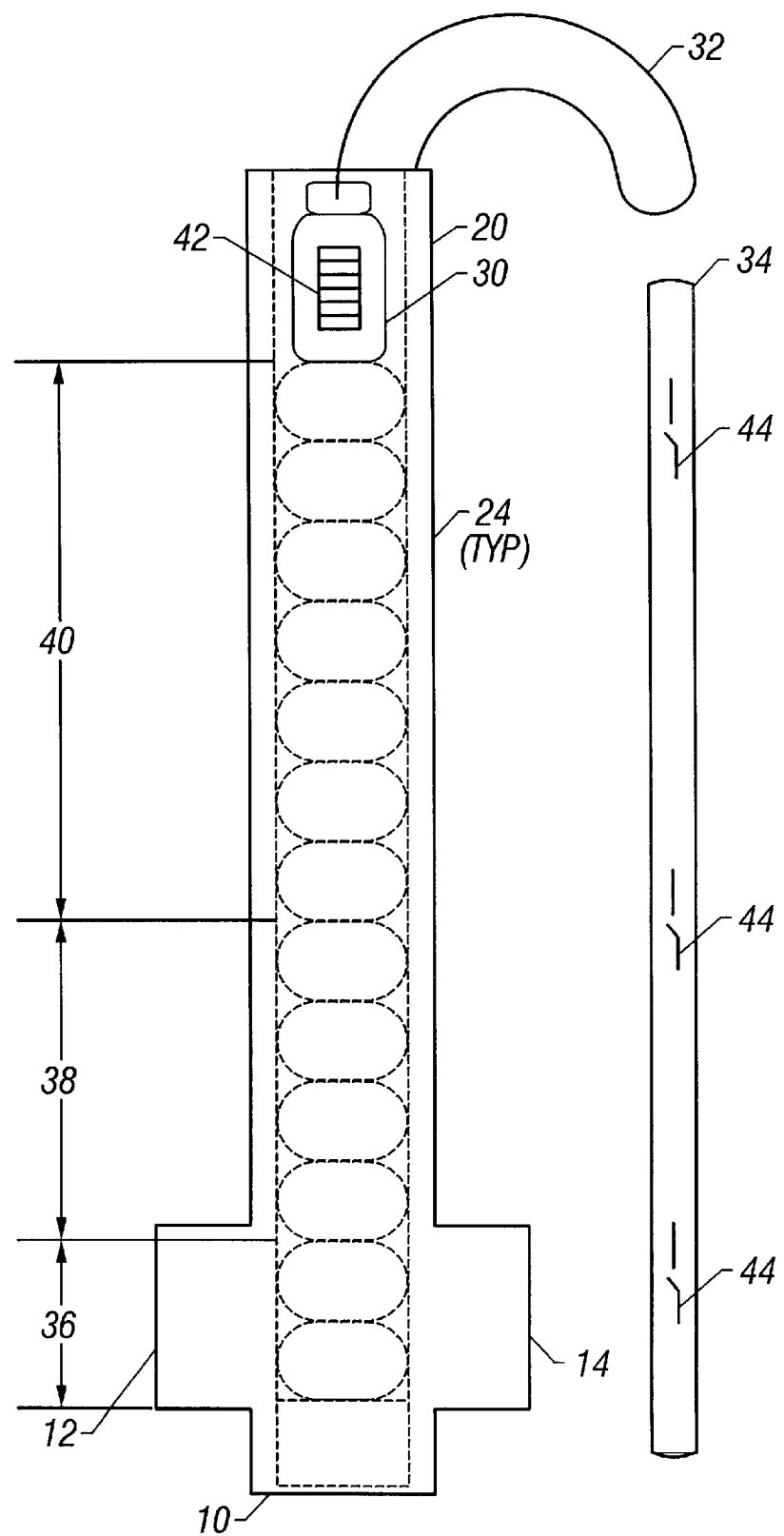
FIG. 2 shows one embodiment of the present invention in the context of a typical automatic chlorinator 10.

FIG. 2 shows one embodiment of the present invention in the context of a typical automatic chlorinator 10. As described in connection with FIG. 1, FIG. 2 shows automatic chlorinator 10, with inlet 12, outlet 14, and a stack of chlorine tablets 24. However, FIG. 2 also shows activator module 30 resting on top of the stack of chlorine tablets 24, coupled to the chlorinator housing 20 by a non-corrosive chain or cord 32. Encapsulated switch module 34 is shown to the right of the automatic chlorinator 10. In operation, encapsulated switch module 34 is coupled to the outside of chlorinator housing 20 via straps, cable clamps, or the like, shown as reference 46 in FIG. 3.

Returning to FIG. 2, as the chlorine tablets 24 at the bottom of the stack dissolve, the top of the stack drops, as does the activator module 30. The activator module 30 includes one or more encapsulated magnets 42, which interact with encapsulated proximity switches 44 inside switch module 34. Proximity switches 44 may be coupled to one or more alarms and power interruption circuits such that when the activator module 30 approaches and drops past a switch 44, an alarm is activated and/or power is interrupted to the system pump.

FIG. 2 also shows one embodiment of the three active zones of the present invention. Zone 36 is designated as "the pump cutoff zone." In a preferred embodiment, the system is said to be "in the pump cutoff zone" 36 when there are only two chlorine tablets 24 remaining in the automatic chlorinator 10. In this embodiment, the switch module 34 is located alongside the outside of the chlorinator housing 20 such that when there are approximately two chlorine tablets 24 remaining in the chlorinator 10, the activator module 30 sitting on top of the two remaining chlorine tablets 24 is sufficiently near a proximity switch 44 inside the switch module to activate the switch 44, which either completes or opens a power interruption circuit to interrupt power to the system pump.

Zone 38 is designated as "the alarm zone." In a preferred embodiment, the system is said to be "in the alarm zone" 38 when there are more than two but less than seven chlorine tablets 24 remaining in the automatic chlorinator 10. Finally, zone 40 is designated as "the refill zone." In a preferred embodiment, the system is said to be "in the refill zone" when there are seven or more chlorine tablets 24 remaining in the automatic chlorinator 10.

Those skilled in the art will appreciate that the lines of demarcation between the pump cutoff zone 36, the alarm zone 38, and the refill zone 40 are approximate and may be selected by practitioners of the present invention to meet the specific needs of different installations. In other words, a practitioner of the present invention could select a smaller pump cutoff zone 36 (e.g., approximately one chlorine tablet 24 remaining) or a larger pump cutoff zone 36 (e.g., approximately three chlorine tablets 24 remaining) without departing from the present invention. Similarly, a smaller or larger alarm zone 38 and refill zone 40 would not depart from the present invention. Finally, practitioners of the present invention could elect to exclude the pump cutoff zone 36 altogether without departing from the present invention.

Figure 3:
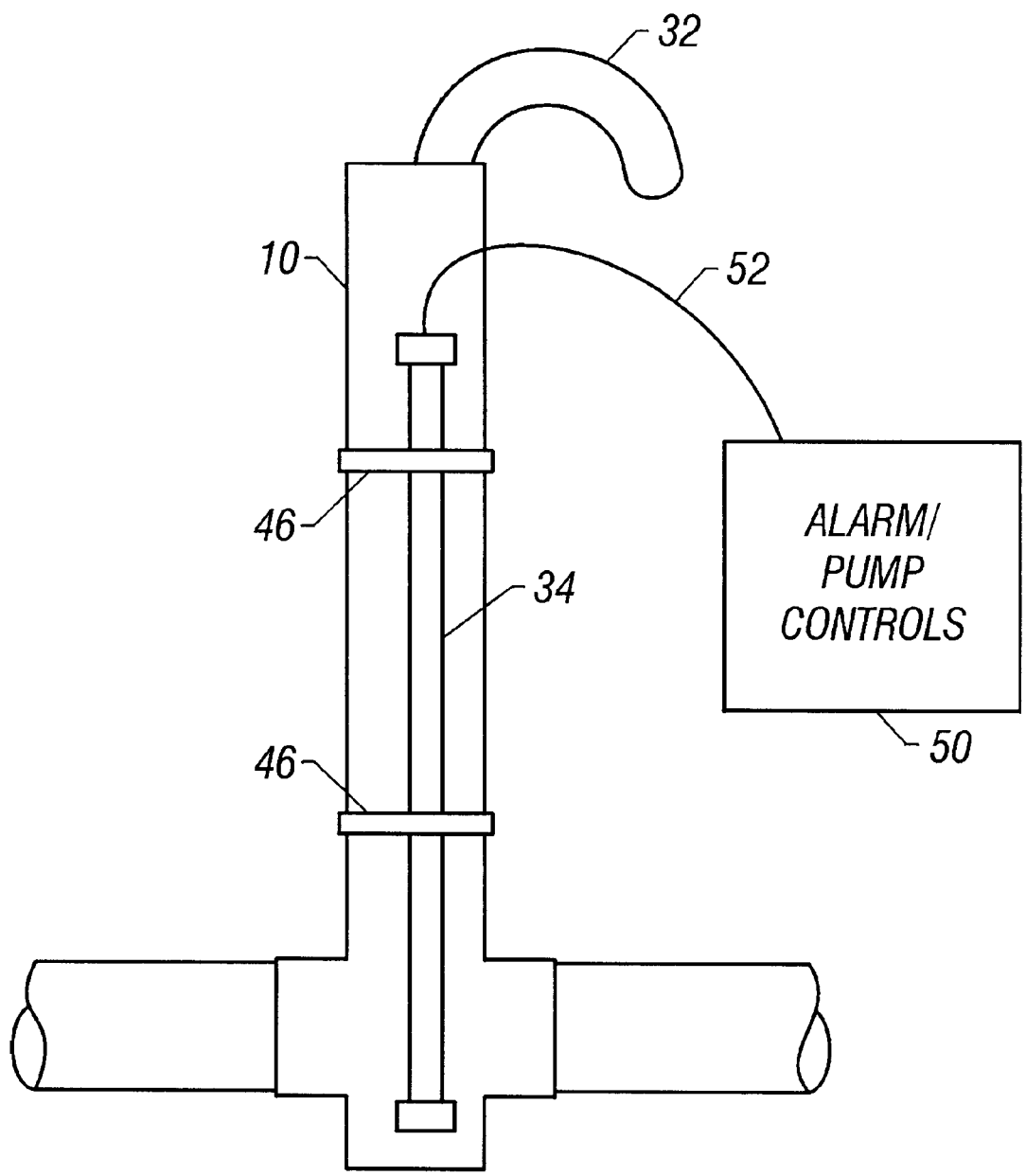
FIG. 3 shows the switch module strapped in place alongside the automatic chlorinator, according to one embodiment of the present invention.

FIG. 3 shows the switch module 34 strapped in place alongside the automatic chlorinator 10. Switch module 34 couples via wire bundle 52 to an alarm (which may be an audible alarm, visual alarm, or combination of both), a pump power interruption circuit, and other operational components of an alarm and control system collectively represented in FIG. 3 as alarm and pump controls 50. Those skilled in the art will recognize that alarms, pump controls, delay circuits, and other alarm and control elements that are capable of functioning with the present invention may be included in a control box or panel collocated with the automatic chlorinator, or they may be located elsewhere, as required or convenient for each particular installation. Similarly, those skilled in the art will recognize that there are a variety of specific implementations of alarms, alarm circuitry, pump controls, and pump power interruption circuits with which the present invention is capable of operating. Those specific implementations are well known in the art and are thus not described herein.

Figure 4:
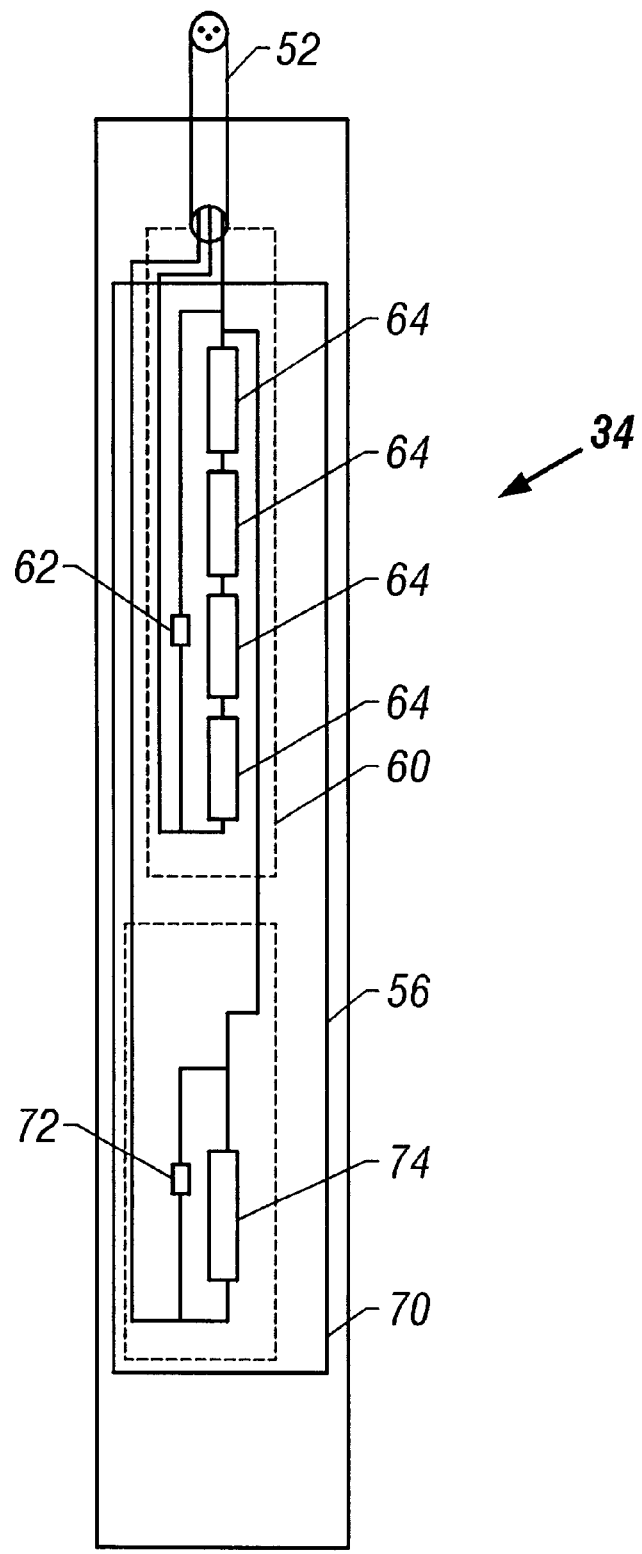
FIG. 4 shows switch module 34 in further detail, according to a preferred embodiment of the present invention.

FIG. 4 shows switch module 34 in further detail, according to a preferred embodiment of the present invention.

Switch module 34 includes a housing 54 and a switch assembly 56, which is coupled to one or more alarms (not shown in FIG. 4) and/or to a pump power interrupt circuit (not shown in FIG. 4) via wire bundle 52. In a preferred embodiment, housing 54 might be constructed of standard polyvinyl chloride (PVC) pipe, and switch assembly 56 is encapsulated within housing 54. Encapsulation insures that switch assembly 56 remains in a fixed position inside housing 54, and also protects switch assembly 56 and wire bundle 52 against corrosion, wear, and tampering.

As shown in FIG. 4, switch assembly 56 includes two chlorine level sensing circuits, designated as alarm/reset circuit 60 and chlorine critical circuit 70. In the embodiment shown in FIG. 4, alarm/reset circuit 60 includes four normally closed reed switches 64, along with bidirectional suppressor 62. Alarm/reset circuit 60 is electrically coupled to one or more alarms. When all four reed switches 64 are closed, the circuit is completed and the alarms are activated.

Chlorine critical circuit 70 includes normally open reed switch 74 and bidirectional suppressor 72. Chlorine critical circuit 70 is electrically coupled to either the power supply for the system pump, or to a pump power interruption circuit, such that when switch 74 closes, power is interrupted to the system pump.

In operation, the switch module 34 is coupled via straps, cable clamps, or equivalent alongside the chlorinator housing, as shown in FIG. 3. The user fills the chlorinator with chlorine tablets and replaces the activator module 30 on top of the stack of tablets. As the chlorine tablets at the bottom of the stack dissolve, the activator module 30 descends, and the magnets 42 within the activator module 30 operate to hold at least one of the four normally closed reed switches 64 in the alarm/reset circuit 60 open, thus preventing the alarm from activating. When the activator module 30 descends to a level where the magnets 42 are no longer close enough to hold the last switch 64 in the alarm/reset circuit 60 open (six or fewer tablets remaining, in a preferred embodiment), that switch closes, completing the alarm/reset circuit 60, and activating the alarm(s).

If the user does not add chlorine tablets, as the chlorine tablets at the bottom of the stack continue to dissolve, the activator module 30 continues to descend within the chlorinator. When the activator module 30 descends to a level where the magnetic field of magnets 42 within the activator module 30 closes the normally open switch 74 in the chlorine critical circuit 70, (approximately two tablets remaining, in a preferred embodiment), the chlorine critical circuit 70 is completed, which then interacts with the pump power circuits to interrupt power to the system pump.

When the alarm/reset circuit 60 is completed and system alarms are activated, the user can reset the system and deactivate the alarms by adding chlorine tablets to the chlorinator and replacing the activator module 30 at the top of the stack of chlorine tablets. The user must add a sufficient number of chlorine tablets to raise the activator module 30 to a position where the magnetic field of the activator module 30 opens at least one normally closed reed switch 64 in alarm/reset circuit 60.

Practitioners of the present invention may want to include an alarm delay circuit to delay the activation of the alarm(s) for a few seconds or minutes after the alarm/reset circuit 60 is completed. An alarm delay circuit allows the activator module 30 to be removed from the system for a few seconds or minutes without the alarm(s) activating. This is a convenient feature which allows the user to remove the activator module 30 and refill the automatic chlorinator without triggering the alarm(s).

Practitioners of the present invention may also want to incorporate additional system safety features into the pump power interruption circuit. The present invention can be configured such that pump power is interrupted when switch 74 in the chlorine critical circuit 70 is closed and restored when switch 74 opens again. Alternatively, in a preferred embodiment, chlorine critical circuit 70 interfaces to a power interruption circuit that incorporates a manually-reset device such as a latching relay. In this embodiment, when switch 74 is open, the power interruption circuit is quiescent and does not interfere with pump power. When switch 74 closes, the relay toggles, and the power interruption circuit then operates to interrupt power to the pump. Even when switch 74 opens again after the user adds chlorine tablets to the chlorinator, the power interruption circuit continues to interrupt power to the pump until the relay is manually reset to the operate position. This feature thus prevents potential system damage and contamination, such as might occur when pump power has been interrupted for a long enough period of time that the system pressure has equalized. As those skilled in the art are very familiar with latching relays and other manually-reset devices and circuits that incorporate these devices, further detail is not provided here.

Those skilled in the art will recognize that the specific number and arrangement of normally-open and normally-closed switches within the switch module described herein is merely one embodiment of a variety of potential arrangements encompassed by the present invention. Alternative embodiments might include switch arrangements that use one or more normally open switches in place of one or more normally closed reed switches 64 in the alarm/reset circuit 60. Likewise, the use of a normally closed switch in the chlorine critical circuit 70, in connection with power interruption circuits configured to interrupt pump power when the chlorine critical circuit opens, would not depart from the present invention. Finally, the relative spacing of the switches inside the switch module 34, coupled with the placement of the switch module 34 relative to the bottom of the chlorine stack, will dictate the demarcation between the pump cutoff zone 36, the alarm zone 38, and the refill zone 40. Embodiments that include different spacings between the alarm/reset circuit 60 and chlorine critical circuit 70 do not depart from the present invention.

In sum, the present invention is a method and apparatus that provides an audible and/or visible alarm and pump control system for automatic chlorinators that are used with septic treatment systems. The present invention comprises a switch module that couples alongside an automatic chlorinator that uses dissolvable standard size chlorine tablets in a stack. The switch module includes a plurality of proximity switches in the reload zone that are capable of being coupled to one or more alarms located in a control panel or elsewhere in the system.

The present invention also includes an activator module that sits on top of the stack of chlorine tablets inside the chlorinator, and descends as the chlorine tablets dissolve. The activator module includes one or more magnets whose magnetic fields interact with the proximity switches in the switch module to prevent the alarm from activating. When the activator module descends below the last switch in the reload zone such that the magnetic field of the internal magnet(s) no longer interacts with the last switch, the alarm is activated, signaling the owner that the chlorinator requires refilling.

The present invention may also include a pump shut-off proximity switch inside the switch module that is capable of being coupled to the system pump or to a pump power interruption circuit. When the activator module descends to the proximity of the pump shut-off switch, the pump shut-off switch closes, completing the chlorine critical circuit which can then interrupt power to the pump. Finally, the present invention may include a reload delay circuit that prevents the alarm from activating when the activator module is removed from the chlorinator for a short period of time, as, for example, during refilling.

Other embodiments of the invention will be apparent to those skilled in the art after considering this specification or practicing the disclosed invention. The specification and examples above are exemplary only, with the true scope of the invention being indicated by the following claims.

We claim the following invention:

1. An automatic chlorinator alarm and control apparatus that comprises:
   a switch module, said switch module couples alongside an automatic chlorinator that uses dissolvable chlorine tablets, said switch module comprises a plurality of proximity switches, said proximity switches are capable of being coupled to an alarm; and
   an activator module, said activator module comprises one or more magnets having a magnetic field, said activator module contacts the chlorine tablets, said magnetic field activates said switches to an open or a closed position to activate an alarm.

2. The apparatus of claim 1, wherein said switch module further comprises a pump shut-off proximity switch that is capable of being coupled to a pump such that when the magnetic field activates said pump shut-off switch, power is interrupted to the pump.

3. The apparatus of claim 2, further comprising a manual reset pump shut-off relay that couples to said pump shut-off proximity switch, when said pump shut-off proximity switch activates, said pump shut-off relay interrupts power to said pump until said pump shut-off relay is manually reset.

4. The apparatus of claim 1, further including a reload delay circuit coupled to said switch module, said reload delay circuit delays activation of the alarm when said activator is removed from the automatic chlorinator.

5. The apparatus of claim 1, wherein said proximity switches are capable of activating an audible tone and visible light.

6. An automatic chlorinator alarm and control system that comprises:
   a switch module, said switch module couples alongside an automatic chlorinator that uses dissolvable chlorine tablets, said switch module comprises a plurality of proximity switches, said proximity switches are capable of being coupled to an alarm; and
   an activator module, said activator module comprises one or more magnets having a magnetic field, said activator module contacts the chlorine tablets, said magnetic field activates said switches to an open or a closed position to activate an alarm.

7. The system of claim 6, wherein said switch module further comprises a pump shut-off proximity switch that is capable of being coupled to a pump such that when the magnetic field activates said pump shut-off switch, power is interrupted to the pump.

8. The system of claim 7, further comprising a manual reset pump shut-off relay that couples to said pump shut-off proximity switch, when said pump shut-off proximity switch activates, said pump shut-off relay interrupts power to said pump until said pump shut-off relay is manually reset.

9. The system of claim 6, further including a reload delay circuit coupled to said switch module, said reload delay circuit delays activation of said alarm when said activator is removed from the automatic chlorinator.

10. The system of claim 6, wherein said wherein said proximity switches are capable of activating an audible tone and visible light.

11. A method that makes an automatic chlorinator alarm and control apparatus comprising:
    providing a switch module, said switch module couples alongside an automatic chlorinator that uses dissolvable chlorine tablets, said switch module comprises a plurality of proximity switches, said proximity switches are capable of coupling to an alarm; and
    providing an activator module, said activator module comprises one or more magnets having a magnetic field, said activator module contacts the chlorine tablets, said magnetic field activates said switches to an open or a closed position to activate an alarm.

12. The method of claim 11, wherein said switch module further comprises a pump shut-off proximity switch that is capable of being coupled to a pump such that when the magnetic field activates said pump shut-off switch, power is interrupted to the pump.

13. The method of claim 12, further comprising providing a manual reset pump shut-off relay that couples to said pump shut-off proximity switch, when said pump shut-off proximity switch activates, said pump shut-off relay interrupts power to said pump until said pump shut-off relay is manually reset.

14. The method of claim 11, further comprising providing a reload delay circuit coupled to said switch module, said reload delay circuit delays activation of said alarm when said activator is removed from the automatic chlorinator.

15. The method of claim 11, wherein said proximity switches are capable of activating an audible tone and visible light.

16. A method to use an automatic chlorinator alarm and control apparatus comprising:
    coupling a switch module alongside an automatic chlorinator that uses dissolvable chlorine tablets, said switch module comprises a plurality of proximity switches, said proximity switches are capable of coupling to an alarm;
    activating one or more of said proximity switches by placing an activator module that comprises one or more magnets having a magnetic field on top of the chlorine tablets inside the automatic chlorinator; and
    activating an alarm when said activator module moves away from said proximity switches.

17. The method of claim 16 wherein said switch module further comprises a pump shut-off proximity switch, said method further comprises interrupting power to a pump when the magnetic field activates said pump shut-off switch.

18. The method of claim 17 wherein said pump shut-off proximity switch is coupled to a manual reset pump shut-off relay that interrupts power to the pump until said pump shut-off relay is manually reset.

19. The method of claim 16, further comprising delaying activation of the alarm when said activator is removed from the automatic chlorinator using a reload delay circuit coupled to said switch module.

20. The method of claim 16, wherein said alarm further comprises an audible tone and visible light.

* * * * *